May 19, 1959 S. REISCH 2,887,269

ELECTRIC PULSE COUNTING AND CALCULATING APPARATUS

Filed Oct. 13, 1953 4 Sheets-Sheet 1

| D1 | | D2 | | D3 | |
|---|---|---|---|---|---|
| IR1 | AR1 | IR2 | AR2 | IR3 | AR3 |
| 3 | 8 | 9 | 1 | 0 | 0 |
| 2 | 9 | 8 | 2 | 0 | 0 |
| 1 | 0 | 8 | 3 | 0 | 0 |
| 0 | 1 | 7 | 4 | 0 | 0 |
| 0 | 1 | 6 | 5 | 0 | 0 |
| 0 | 1 | 5 | 6 | 0 | 0 |
| 0 | 1 | 4 | 7 | 0 | 0 |
| 0 | 1 | 3 | 8 | 0 | 0 |
| 0 | 1 | 2 | 9 | 0 | 0 |
| 0 | 1 | 1 | 0 | 0 | 1 |
| 0 | 1 | 0 | 1 | 0 | 1 |
| 3 | 1 | 9 | 1 | 0 | 1 |
| 2 | 0 | 8 | 0 | 0 | 1 |
| 1 | 9 | 8 | 9 | 0 | 0 |
| 0 | 8 | 7 | 8 | 0 | 0 |
| 0 | 8 | 6 | 7 | 0 | 0 |
| 0 | 8 | 5 | 6 | 0 | 0 |
| 0 | 8 | 4 | 5 | 0 | 0 |
| 0 | 8 | 3 | 4 | 0 | 0 |
| 0 | 8 | 2 | 3 | 0 | 0 |
| 0 | 8 | 1 | 2 | 0 | 0 |
| 0 | 8 | 0 | 1 | 0 | 0 |

Inventor:-
Siegfried Reisch,
by Pierce, Scheffler & Parker,
Attorneys.

May 19, 1959 S. REISCH 2,887,269

ELECTRIC PULSE COUNTING AND CALCULATING APPARATUS

Filed Oct. 13, 1953 4 Sheets-Sheet 3

*Inventor:*
*Siegfried Reisch,*
*by Pierce, Scheffler & Parker,*
*Attorneys.*

Inventor:-
Siegfried Reisch,
by Pierce, Scheffler + Parker,
attorneys.

2,887,269

ELECTRIC PULSE COUNTING AND CALCULATING APPARATUS

Siegfried Reisch, Ivrea, Italy, assignor to Ing. C. Olivetti & C., S.p.A., Ivrea, Italy Application October 13, 1953, Serial No. 385,866

Claims priority, application Sweden October 18, 1952

7 Claims. (Cl. 235—160)

The present invention relates to the methods and equipments for electric pulse counting and calculating.

Most machines heretofore known depend upon the use of a plurality of cascade coupled elements which, as for instance the so-called flip-flop elements, may each assume either of two stable states. Thus a plurality of $n$ cascade coupled elements may assume $2^n-1$ different stable states. When using the decimal notation each denominational order requires 4 elements, which are capable of assuming $2^4-1=15$ different stable combinations. However, only ten combinations thereof will be used.

It is self-explanatory that such a technique does not allow of an economical replacement of the mechanical counting and calculating units, whereby the use of said technique has hitherto been confined to big special machines. As a matter of fact, the register of a conventional office calculating machine, having for instance 20 denominational orders, would require a cascade of 80 flip-flop elements consisting of at least 160 to 320 triodes, besides a number of additional tubes for performing various auxiliary functions.

It is an object of the present invention to provide a method and the apparatus for electric pulse counting and calculating, which work most simply and which requires a reduced number of parts, thereby enabling the economical utilization of electronics for conventional office machines.

Other objects of the invention will be apparent from the specification, drawings and claims accompanying herewith.

Referring to the drawings.

Figures 4, 4A:
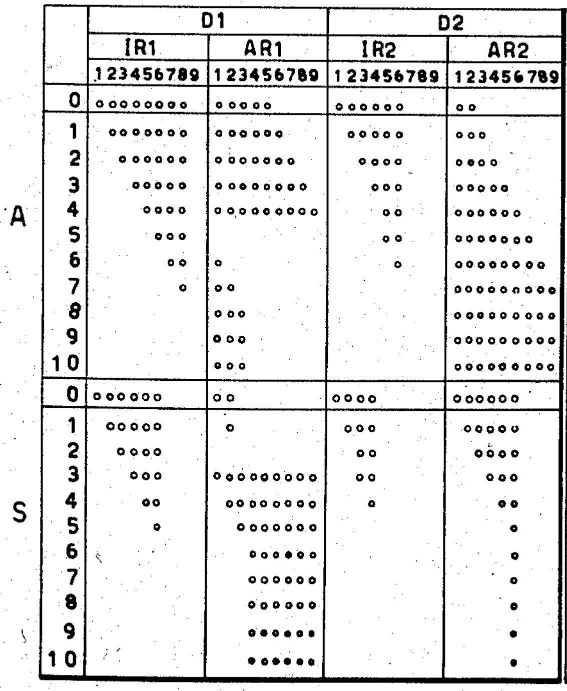
Figures 5, 7, 8:
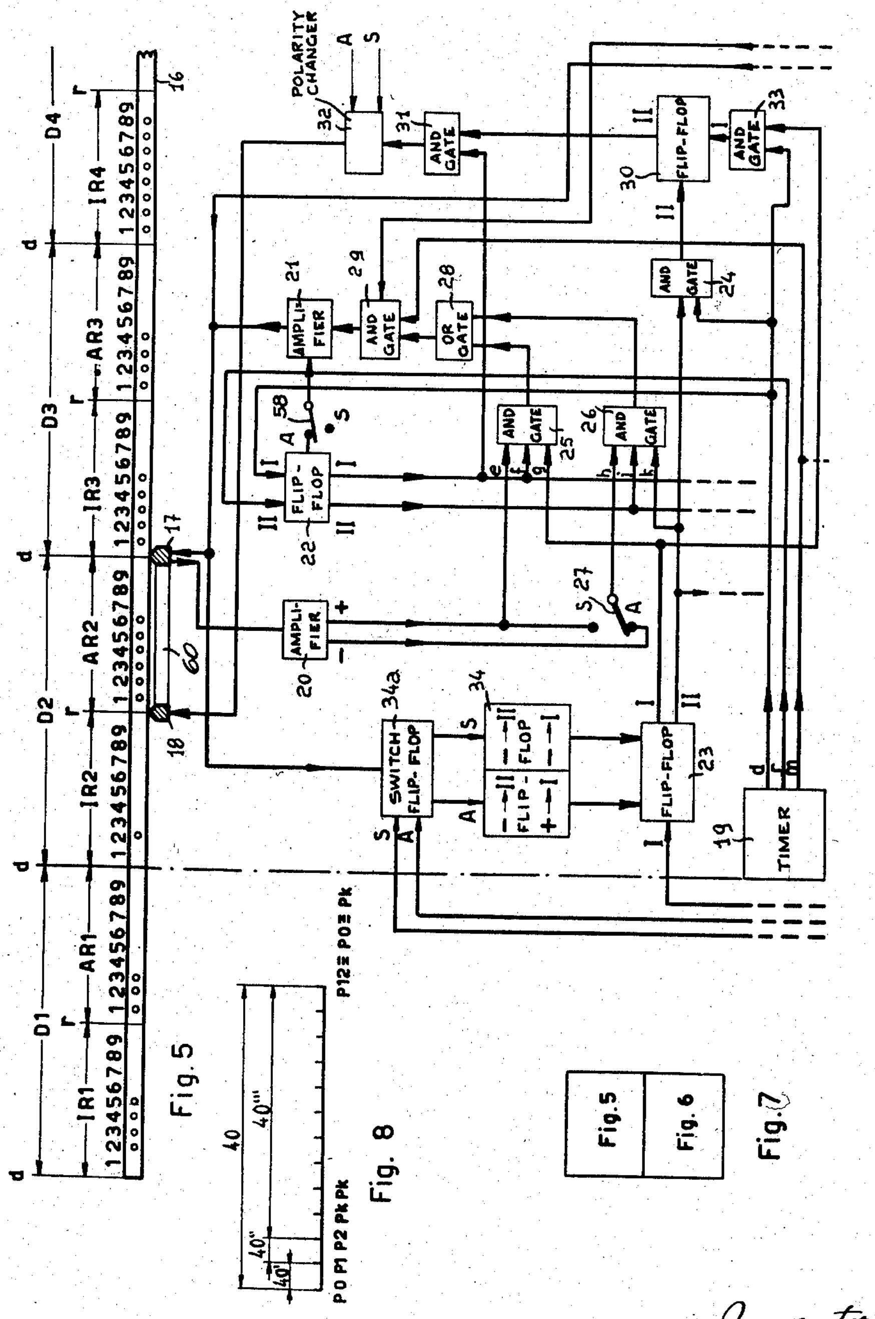
Figure 6:
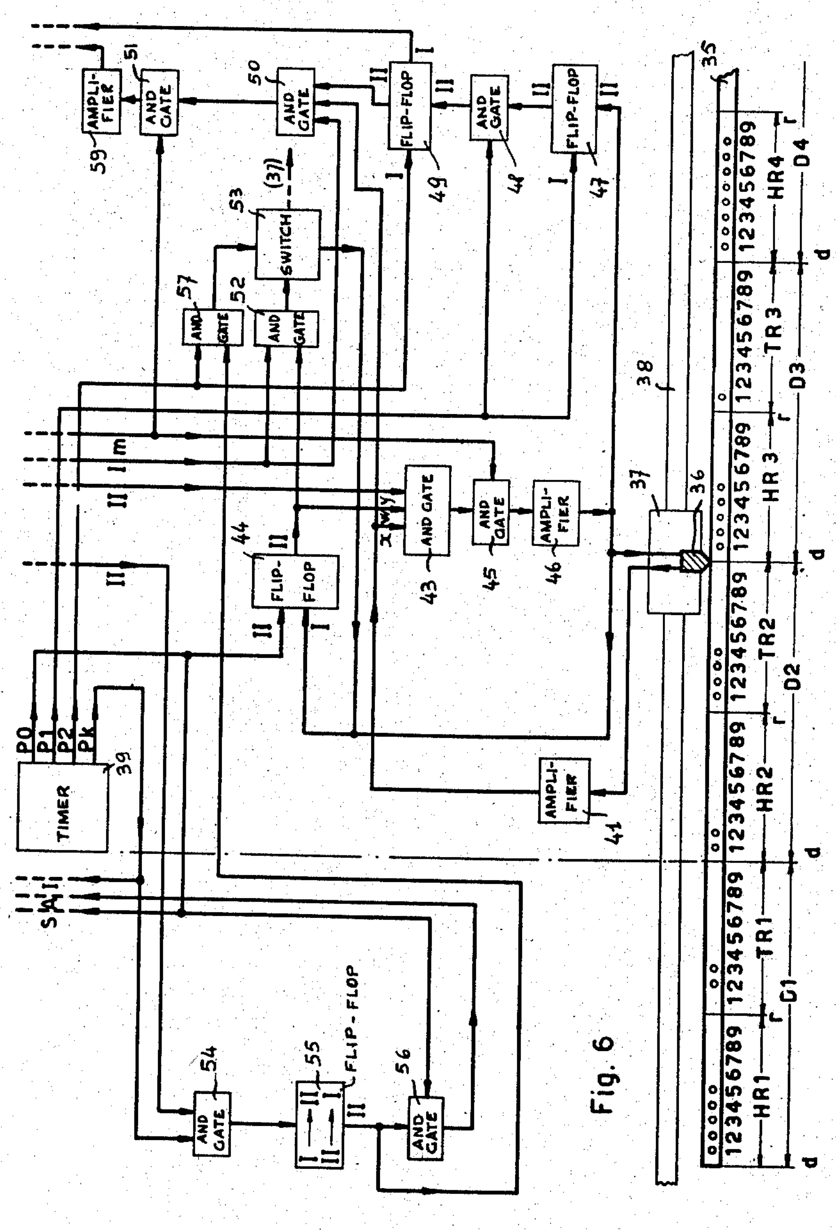

Figs. 4 and 4*a* are schematically representation of two examples of addition of decimal numbers (upper part A), and of two examples of subtraction of decimal numbers (lower part S);

Fig. 5 is a block diagram of a decimal computing apparatus;

Fig. 6 is a block diagram of additional equipment to be coupled to said computing apparatus for adapting it to a calculating apparatus for the four rules;

Fig. 7 indicates how Figs. 5 and 6 are to be combined to show the complete wiring diagram of said calculating apparatus; and Fig. 8 is a diagram showing the pulses produced during a calculating period.

*Counting method*

The mode of operation which is common to all the embodiments of the invention hereinafter described is based on transferring the digits unit by unit and may be considered to be a kind of electrical equivalence of a conventional abacus.

The accumulator of the counting device, as well as of the calculating machine hereinafter disclosed, comprises a plurality of denominationally grouped and sequentially arranged elements. In the case of the decimal notation each denominational order consists of nine elements. Before describing the real nature of said elements, assume now that each element is made of a cell, box or the like, which may be filled with a counting pulse corresponding to one unit. The accumulator is rotatable to cyclically present its denominational orders, in sequence from the lowest to the highest order, to a device which is capable of cyclically entering a pulse therein. More particularly, an incoming pulse fills in the first unfilled cell of the first denominational order. When an order is filled up, the next incoming impulse effects a carry over by filling in the first unfilled cell of the next higher order and furthermore emptying all the cells of the preceding order. It will be apparent that a one-to-one correspondence is thereby established between the number of cells filled in of an order and the value of the digit to be represented.

Figure 1:
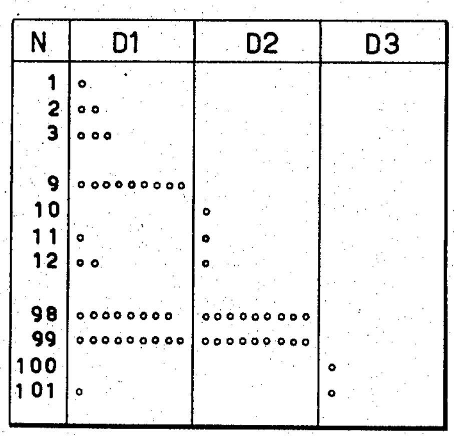
Fig. 1 shows a mode of representation of decimal numbers.

A simplified diagram of the counting method is shown in Fig. 1, wherein N indicates a number to be represented and D1, D2, D3 the denominational orders of the accumulator. The small circles shown in the figure represent each a cell filled with a pulse. It will be seen that this way of representation corresponds to that of a conventional abacus.

Figure 2:
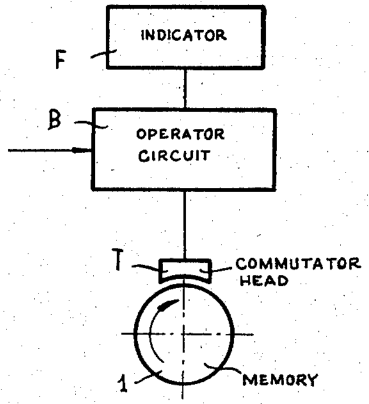
Fig. 2 is a rough block diagram showing a counting device.

Fig. 2 shows a rough block diagram of the counting device. B indicates an operator circuit, T a commutator head and 1 the accumulator, which is supposed to be rotatable in front of the commutator head T. The incoming pulses enter the operator B. F indicates an output indicator capable of indicating the amount accumulated in the accumulator 1.

Figure 3:
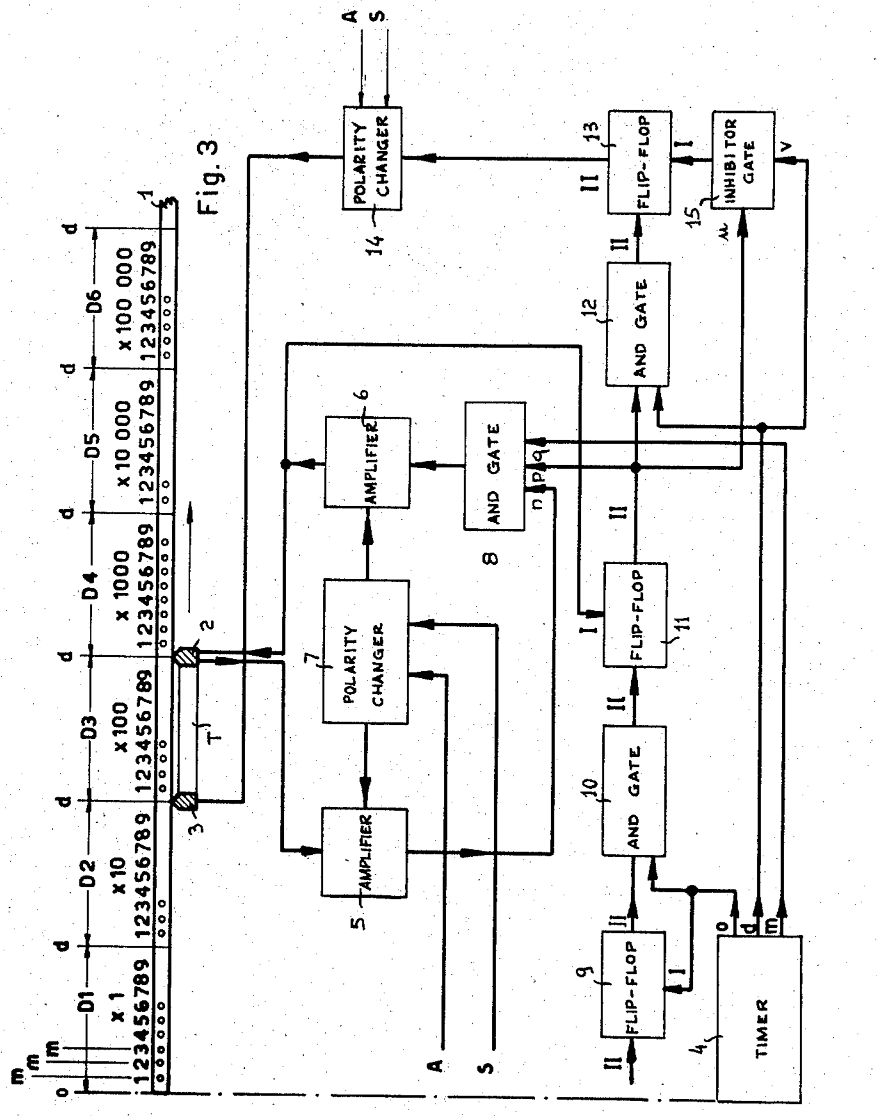
Fig. 3 is a block diagram of a decimal pulse counting device.

With reference to Fig. 3, wherein the accumulator 1 is shown developed in a plane, it will be seen that when rotating the accumulator 1 shall present its cells to the commutator head T, Fig. 2, in sequence from the lowest order to the highest order. The operator circuit B determines the mode of operation of the commutator head T, which first senses the state of the cells and thereupon enters an incoming pulse into the first cell not yet filled in.

The accumulator 1 may be of any suitable type known in the art. However, a magnetic accumulator of the type having a magnetic track arranged around the periphery of a rotating drum may be preferable. Each digital unit is entered into the accumulator by applying a magnetic dipole to the track. In this case the cells considered hereinabove shall no more exist and shall be simply imaginary, inasmuch as the magnetic track represents a continuous uninterrupted recording medium. Nevertheless, to make the description easier, the single magnetic spots wherein the track may be ideally divided shall further be referred to as cells. If the capacity of the accumulator should be of twelve decimal orders, $9\times12=108$ cells shall therefore be provided.

Other accumllators of a known type may be used in lieu of the magnetic type accumulator, say for example an array of gaseous discharge tubes cyclically scanned by a distributor, or the screen of a Williams tube. The latter offers the advantags of not depending upon the operation of mechanically moving elements. However, the embodiments of the invention hereinafter described shall make use of a magnetic accumulator, of the type consisting of a rotatable magnetic drum of any construction known per se.

*Counting device*

Fig. 3 shows a block diagram of a decimal pulse counting device designed to be operated according to the method described hereinbefore.

The accumulator 1 comprises $n$ denominational orders, each formed of a number of cells, nine in the case of the decimal notation. The commutator head T consists of two magnetic heads 2 and 3; the latter is arranged at a distance of one order from the first, at the side of the lower orders. The magnetic head 2 comprises two coils, not shown in the drawing, namely a reading coil and a writing coil, whereas the magnetic head 3 comprises a writing coil only, not shown in the drawing. As is known in the art, the magnetic track of the accumulator is initially polarized in a certain direction, say with the North pole directed downwards. To enter a counting pulse into the accumulator a magnetic dipole of the opposed polarity, i.e. with the North pole directed upwards, which shall hereinafter be called a positive point, is recorded in a cell of the accumulator, thereby "writing" the pulse therein. To "erase" said pulse a magnetic dipole of the first polarity, i.e. with the North pole directed downwards, which shall hereinafter be called a negative point, is superseded to the first dipole, thereby restoring the cell to its initial condition. No cell is provided for the digit "zero"; the presence of a "zero" in a denominational order of the accumulator is identified by the absence of positive points in all the nine cells of that order.

As mentioned hereinabove, the accumulator 1 is rotatable, whereby, when considered in the relative motion, the commutator head T moves in the direction of the arrow with respect to the accumulator 1. From the movement of the accumulator, which is rotated through entire cycles, various synchronizing signals are derived to control the operations occurring during the counting process, as is well known per se. Said signals may be generated by means of a set of contacts, or, as for example, by a sort of toothed wheel made of magnetic material and rotating with the accumulator to cooperate with one or more induction coils. A suitable timer of this type is known, for example, from United States Patent No. 2,609,143, showing various timing wheels 150, 220 and 230 (Figs. 1 and 3), and from the Belgian Patent No. 505,684 patented September 29, 1951, showing timing wheels 101 and 102 (Fig. 1). In the present case the timer for generating the various synchronizing signals is shown in block form at 4 in Fig. 3 and is designed to generate three types of signals, namely the signals, $o$, $d$, and $m$, the timed relation of which is indicated in Fig. 3 above the accumulator 1. Signal $o$ is the cycle signal indicating the beginning of a new cycle of the accumulator 1 with respect to the magnetic head 2. The $d$ signals indicate each the beginning of a new denominational order. The $m$ signals are generated one for each cell of the accumulator and represent the elementary time unit upon which the whole synchronizing system is based. These $m$ signals are produced to record the magnetic points mentioned hereinabove exactly in the middle of each cell of the accumulator.

The description of the other units shown in block form in Fig. 3 shall now follow. These units comprise mainly amplifier, gate, polarity changer and flip-flop circuits of conventional type. More particularly, the blocks 8, 10 and 12 indicate and-gate circuits which may be, for example, of the general type shown within the rectangles 211 and 201 (Fig. 1) of Belgian Patent No. 505,684. The blocks, 9, 11, and 13 indicate flip-flop circuits, for example of the type shown in Fig. 5 of United States Patent No. 2,549,071. Since each flip-flop may assume either of two stable states referred to hereinafter as state I and state II, Fig. 3 shows for each flip-flop input the state to which the flip-flop is switched by a pulse applied thereto, and similarly, for each flip-flop output the state by which said output is energized. The comprehension of the diagram should be thereby facilitated.

The reading coil of the magnetic head 2 is coupled through an amplifier 5 to the and-gate 8, which is coupled in turn, through an amplifier 6, to the writing coil of the magnetic head 2. Suitable circuits for the amplifiers 5 and 6 are shown, for example, in Fig. 3 of Belgian Patent No. 505,684, aforesaid.

A hand or automatically operable polarity changer 7 is coupled to both the amplifiers 5 and 6, to the end of determining the polarity of the signals sent by the amplifier 5 to the gate 8 as well as of the signals sent by the amplifier 6 to the writing coil of the magnetic head 2. The polarity changer 7 may be a switch of any suitable type known in the art, such as a manual, electromagnetic or electronic switch, and is operable to reverse the sense of the counting operation from additive counting (A) to subtractive counting (S) and vice-versa. Therefore, this polarity-changer may not be required in the case of counting either additively or subtractively only.

The and-gate 8 energizes its output only upon simultaneous energization of its three inputs $n$, $p$ and $q$.

The counting pulses, generated in any known manner, are applied to the input II of the flip-flop 9. Both the output II of the flip-flop 9 and the signals $o$ generated by the timer 4 are applied to the and-gate 10. The output of the gate 10 is coupled to the input II of the flip-flop 11, the output II of which applies to the and-gate 12. The $d$ signals generated by the timer 4 are sent to the gate 12, the output of which applies to the input II of the flip-flop 13. The output II of the latter is coupled to the writing coil of the magnetic head 3 through a polarity changer 14, which determines the polarity of the energization applied to said coil. The remarks made in regard to the polarity changer 7 apply as well to the polarity changer 14.

An inhibitor-gate 15 energizes the input I of the flip-flop 13 as its input $v$ receives a $d$ signal from the timer 4 and simultaneously its input $u$ is not energized by the output II of the flip-flop 11. A suitable gate circuit of this type is described in the above mentioned Belgian Patent No. 505,684 with reference to Figs. 14A and 14C thereof.

*Additive counting*

Suppose now that an arbitrary amount, say 528436, is already stored in the accumulator 1, as shown in Fig. 3 by means of the small circles each representing a cell filled with a pulse. As said hereinabove, one pulse may be written during each cycle of the accumulator 1, and, therefore, the pulses should be generated with a frequence not higher than the cycling frequence of the accumulator.

A pulse to be counted, applied to the flip-flop 9, switches the latter from the state I to the state II. Upon generation of the first cycle signal $o$ the gate 10 is opened and the flip-flop 11 is set from the state I to the state II. At the same time the $o$ signal, applied to the flip-flop 9, restores the latter to the state I thereby enabling it to receive a new pulse to be counted.

As mentioned hereinabove, the $o$ signal is generated at the instant in which the magnetic head 2 enters the first denominational order D1 of the accumulator. As long as the polarity changer 7 is set for additive counting the amplifier 5 sends no signal to the gate 8 upon the reading of positive points, i.e. of cells filled with a pulse. As the reading coil of the magnetic head 2 encounters the first unfilled cell, said cell being the seventh cell of the first order in Fig. 3, the amplifier 5 sends a signal to the input $n$ of gate 8. Since the input $p$ has been energized by the flip-flop 11, the gate 8 opens upon the arrival of an $m$ signal at $q$, thereby energizing the amplifier 6, which in turn sends a signal to the writing coil of the magnetic head 2.

It will thus be apparent that the point is written at the instant determined by the signal $m$. Of course, this writing process takes place with a slight delay with respect to the instant the corresponding cell has just been read, due to the unavoidable delay occuring in the circuit. The reading instant should, therefore, be anticipated to compensate said delay. To this end the writing coil should be separated from the reading coil by shifting the latter to the right, Fig. 3, as is known in the art for other purposes. However, this measure is here rather superfluous in view of the definite extension of the magnetic points written by the magnetic head 2. If the reading coil is sensitive enough, it will ascertain the polarity of said point just before reaching the exact writing position determined by the signal *m*.

The signal emitted by the amplifier 6 is sent as well to the flip-flop 11, which is thereby reset to the state I. The accumulator 1 completes thereupon its cycle without further variations, because as long as the flip-flop 11 remains in its state I the further signals sent by the amplifier 5 to the gate 8 upon the reading of the remaining unfilled cells of the accumulator are ineffective.

When a denominational order has been filled up, a pulse stored in the flip-flop 11 may not be written into said order and a carry over has to be effected.

In this case the flip-flop 11 remains in its state II until the magnetic head 2 will encounter the first unfilled cell of the next higher order and thereby be enabled to write said pulse. Thus, if for instance an amount of 99999 is already stored in the accumulator and one unit has to be added thereto, the magnetic head will move idle all over the first five orders D1 to D5 and write a positive point into the first cell of the sixth order.

To complete the carry over process all the positive points of the lower filled up orders have to be erased, to the end of restoring said orders to "zero." This erasure is brought about by the writing coil of the magnetic head 3 as follows. When the flip-flop 11 is in its state II and a *d* signal, indicating that the magnetic head 2 has passed to a next higher order, is generated by the timer 4, the gate 12 opens and the flip-flop 13 is set from the state I to the state II. The flip-flop 13 thereupon energizes the magnetic head 3 to continuously write negative points, whereby all the positive points of the order preceding the order juxtaposed to the magnetic head 2 are erased. If in the meantime the magnetic head 2 finds a cell wherein a pulse stored in the flip-flop 11 may be written, the latter is reset to its state I and the flip-flop 13 is as well reset to the state I responsive to the signal emitted by the inhibitor-gate 15 upon reception of the next *d* signal.

Returning to the example of the amount 99999 stored in the accumulator, the flip-flop 13 is reset to the state I upon the generation of the sixth *d* signal and erasure of positive points takes place all over the first five orders D1 to D5 of the accumulator.

*Subtractive counting*

Upon switching the polarity changers 7 and 14 to subtractive counting one unit is subtracted from the amount stored in the accumulator upon the reception of each counting pulse.

It will thus be apparent that a signal is sent by the amplifier 5 to the gate 8 as the first positive point is read by the magnetic head 2, and that the signal sent thereupon by the amplifier 6 to the writing coil of the magnetic head 2 is a negative point, to erase the positive point just read. Furthermore, as long as the flip-flop 13 is in its state II, the magnetic head 3 writes positive points into the accumulator.

The pulses to be counted are sent to the flip-flop 9. It is to remark that the positive points are erased by the magnetic head 2 beginning from the first left hand filled in cell of each order, instead of from the first right hand filled in cell. This feature which distinguishes the subtractive counting process from the additive counting process has no consequences and additive counting could at any time be resumed, irrespective of the irregular position of the positive points within the single orders, since the process relies upon the number of said points within a single order, and not on their respective positions.

If desired, it would however be possible to erase the positive points beginning from the first right hand cell filled in. To this end a magnetic head should be mounted at the distance of one cell from the magnetic head 2.

*Computing method*

It will be apparent that the counting method outlined hereinabove may be used in adding and subtracting computation. The computing method and the mode of operation of an embodiment of a computing apparatus shall now be described with reference to Figs. 4 and 5.

The accumulator of the computing apparatus is formed of two registers, namely an input register and an accumulating register. According to the invention, said registers are arranged on a single magnetic track and are cyclically presented to one commutator head.

As shown in Fig. 5, each order of the accumulator 16, as the orders D1, D2 . . . D*n*, is formed of the corresponding suborders of an input register IR and an accumulating register AR, said suborders being arranged in the sequence IR1, AR1, IR2, AR2 . . . IR*n*, AR*n*. The amount to which an addend is to be added or from which a subtrahend is to be subtracted is stored in the accumulating register AR, whereas either said addend or said subtrahend is first entered into said register IR. The means for preliminarily effecting the entry of said data shall not be described herein, inasmuch as they may be of any type known in the art and depend upon the use of any digital source, say a keyboard, a perforated record card or any other digital representation means.

The general adding method according to the invention is illustrated in the upper part A of Fig. 4, which shows two examples of addition, the first (68+25) in detail and the second (93+18) summarized. According to said method the operation consists substantially in transferring the addend (68 and 93 respectively) from the input register IR to the accumulating register AR, where the other factor (25 and 18 respectively) is stored, said transfer being effected according to the counting method previously described.

Therefore, an operation of addition is formed of the combination of a subtractive counting operation in the input register IR with an additive counting operation in the accumulating register AR, whereby the digits to be transferred are split into units to be cyclically elaborated one for each order.

The computing process comprises a plurality of steps, which are represented in the lines 0, 1, 2 etc. of the diagram of Fig. 4. Line 0 shows the initial situation of the accumulator after the entry of the date. Line 1 shows the situation upon completion of the first accumulator cycle. It will be seen that a positive point has been erased from the first left hand cell of IR1, and written into the first unfilled cell of AR1. One unit has been similarly transferred from IR2 to AR2. This transfer operation occurs as long as there are positive points to be picked up in any order of the input register IR. In the case of the decimal notation ten accumulator cycles are assigned to the operation. In the first of the two addition examples previously referred to the ninth and tenth cycle are idle. Nevertheless, ten cycles must always be assigned to the operation inasmuch as an order of the input register IR might have been filled up, thereby requiring nine cycles and an additional cycle for the case of a carry over having been caused in the next lower order. This is the case of the second example of Fig. 4 (93+18), wherein line 2 shows that the positive point picked up from IR1 may not be written sooner than into AR2, whereby no positive point is picked up from IR2 during said cycle.

The operation of subtraction is formed of the combination of a subtractive counting operation in the input register IR with a subtractive counting operation in the accumulating register AR.

The process is illustrated in the lower part S of Fig. 4, which shows two examples of subtraction, the first (62−46) in detail and the second (111−93) summarized, Since this process is perfectly similar to the process illustrated above, no further details will be given in respect of subtraction.

*Computing apparatus*

With reference to Fig. 5, the accumulator 16 is, as in the preceding embodiment, of the rotating type, whereby its suborders IR1, AR1, IR2, AR2 . . . IR*n*, AR*n* are sequentially presented to a commutator head comprising two magnetic heads 17 and 18. The latter is arranged at a distance of a suborder from the first, at the side of the lower orders. The magnetic head 17 comprises two coils, not shown in the drawing, namely a writing coil and a reading coil, whereas the magnetic head 18 comprises a writing coil only, not shown in the drawing.

As in the case of the counting device, a timer 19 similar to the timer 4 (Fig. 3) rotates with the accumulator 16 for giving a series of synchronizing signals hereinafter identified as *d*, *r* and *m* signals. The timed relation of said signals is diagrammatically shown above the accumulator 16 and is referred to the position of the magnetic head 17. The timer 19 could generate as well a cycle signal as the cycle signal *o* generated by the timer 4 of the counting device. However, this signal is not strictly necessary for the operation of the machine.

The description of the other units shown in block form in Fig. 5 will now follow. As in the case of the counting device shown in Fig. 3, these units comprise mainly amplifier, gate, poplarity changer and flip-flop circuits of conventional type. More particularly, said units comprise and-gate circuits 24, 25, 26, 29, 31, and 33, and flip-flop circuits 22, 23 and 30, which may be of the same type of the and-gate and flip-flop circuits, respectively, previously referred to in connection with Fig. 3. The remarks previously made in regard of the two states of each flip-flop apply as well to the flip-flops described hereinafter.

The reading coil of the magnetic head 17 is coupled to an amplifier 20 similar to the amplifier 5 (Fig. 3). The writing coil of said magnetic head is coupled to an amplifier 21 which is controlled through a switch 58 to generate either positive or negative writing signals. A suitable amplifier of this type is known, for example, from United States Patent 2,540,654, showing a writing circuit (Fig. 5) which writes "1" or "0" under the control of a switching unit 73 (Fig. 4). The switch 58, which may be of any suitable type known in the art, such as a manual, electromagnetic or electronic switch, may assume either a position of addition A or a position of subtraction S. In the position A the amplifier 21 is controlled by a flip-flop polarity changer 22 for alternatively generating negative signals during the phases IR and positive signals during the phases AR. In the position S the flip-flop 22 is disconnected and the amplifier 21 is invariably conditioned for generating negative signals only. The flip-flop polarity changer 22 is controlled by the timer 19 to the purpose of being switched from the state II to the state I by a *d* signal and from the state I to the state II by an *r* signal, whereby the flip-flop 22 will distinguish the phases IR, initiated by the *d* signals, from the phases AR, initiated by the *r* signals.

The output II of the flip-flop 23 applies to the and-gate 24; both outputs I and II are further coupled to the inputs *g* and *k*, respectively, of the two and-gates 25 and 26. The further inputs *f* and *i*, respectively, of these gates are controlled by the states I and II, respectively, of the flip-flop 22; moreover, the inputs *e* and *h*, respectively, of said gates are controlled by the signals sent by the amplifier 20 and passed through a switch 27 of any suitable type known in the art, such as a manual, electromagnetic or electronic switch. The latter may assume either a position of addition A or a position of subtraction S.

28 indicates an or-gate which may be alternatively energized by either the gate 25 or the gate 26. Suitable or-gates are shown in the said Belgian Patent 505,684 at the right-hand side of Figs. 12A and 13A. The output of the gate 28 applies to the and-gate 29, which is energized by an *m* signal generated by the timer 19. The further input of the gate 29, as shown in Fig. 5, should be considered as constantly energized. The output of the gate 29 applies, through the amplifier 21, to the writing coil of the magnetic head 17.

The gate 24 may be opened by a *d* signal and its output applies to the input II of the flip-flop 30. The output II of the latter applies to the and-gate 31 which is controlled by the state I of the flip-flop 22.

32 indicates a polarity changer similar to the polarity changer 14 (Fig. 3) and which is operable when the computation is shifted from addition (A) to subtraction (S) and vice-versa, to determine the polarity of the energization of the writing coil of the magnetic head 18. The gate 31 has been put under the control of the flip-flop 22 to permit the magnetic head 18 to be energized during the IR-phases only of the accumulator, i.e. when the magnetic head 18 is juxtaposed to an order of the accumulating register AR.

The and-gate 33 is provided to restore the flip-flop 30 to the state I, said gate 33 being controlled by the state I of the flip-flop 23 and by the *d* signal generated by the timer 19.

The flip-flop 23 is operable by a flip-flop 34, which under the control of a flip-flop switch **34*a* may act in two different ways. The switch 34*a* which like the polarity changer 32** is shiftable from addition (A) to subtraction (S) and vice versa, may be of the well known flip-flop type, resulting from the combination of a flip-flop with a plurality of gates, as is known for example from the book "High-Speed Computing Devices," staff of E.R.A., McGraw-Hill 1950, showing in Figs. 4–5*b* (page 48) a gate-flip-flop combination adapted to switch the incoming pulses 9s to either of two ouputs under the control of suitable set and reset signals. If the switch **34*a* has been shifted to addition, the flip-flop 34 acts in the manner schematically shown in its left hand half. More particularly, upon reception of a negative signal sent by the amplifier 21 the flip-flop 23 is set by the flip-flop 34 to the state II and upon reception of a positive signal the flip-flop 23 is reset to the state I. If, on the contrary, the switch 34*a* has been shifted to subtraction, the flip-flop 34 acts in the manner schematically shown in its right hand half, according to which the flip-flop 23 is alternatively switched by consecutive signals of the same polarity. As previously described, in the case of subtraction the amplifier 21 generates negative signals only, said signals being enabled by the flip-flop 34 to likewise switch the flip-flop 23. The functions recited for the flip-flop 34** may be suitably performed, for example, by a flip-flop of the type shown in the article "An Electronic Digital Computer" by A. D. Booth, Electronic Engineering, December 1950, page 493, Fig. 2. The flip-flop shown therein may be either set by a signal applied to its input *c* and reset by a signal applied to its input *e* or set and reset alternatively by consecutive signals applied to its input *d*.

*Addition*

Assume now that as shown in Fig. 5, an amount 463 is stored in the accumulating register AR and an addend 8514 is stored in the input register IR. The entry of said data may be effected in any known manner, as mentioned hereinbefore. The output of the results, as for example of the amount finally accumulated in the accumulating register AR, may likewise be effected in any known manner and shall not be described.

Considering now the particular position of the magnetic heads 17, 18 represented in Fig. 5, it will be seen that the magnetic head 17 has just passed from AR2 to IR3. The flip-flop 23 has been reset to its state I, and the *d* signal just generated has reset the flip-flop 22 to its state I.

As the reading coil of the magnetic head 17 reads the first positive point of IR3, a signal is sent to the gate 25 by the output marked "+" of the amplifier 20. Since the gate 25 is simultaneously energized by the flip-flops 22 and 23, it energizes the or-gate 28. Upon the arrival of an *m* signal the gate 29 will be opened and the amplifier 21 will send a signal to the writing coil of the magnetic head 17. Since the amplifier 21 is suitably controlled by the flip-flop 22, said signal is a negative point, which erases the positive point just read. At the same time, said signal is sent to the flip-flop 34, which thereupon sets the flip-flop 23 to the state II. This state of the flip-flop 23 indicates that an impulse is to be written into the accumulating register AR.

The signals generated at the output "+" of the amplifier 20 by the further positive points of IR3 read by the magnetic head 17 are ineffective, because the gate 25 is coupled to the state I of the flip-flop 23.

The signals thereafter generated at the output marked "—" of the amplifier 20 by the negative points of IR3 read by the magnetic head 17 are likewise ineffective, the gate 26 being coupled to the state II of the flip-flop 22.

As the magnetic head 17 passes from IR3 to AR3 the timer 19 generates an *r* signal which sets the flip-flop 22 to the state II.

The signals generated at the output "+" of the amplifier 20 by the positive points of AR3 then read by the magnetic head 17 are ineffective, because the gate 25 is coupled to the state I of the flip-flop 22.

As the magnetic head 17 reads the first unfilled cell of AR3, i.e the first negative point, the signal thereupon generated at the output "—" of the amplifier 20 passes through the gate 26 and causes the writing of a positive point into the cell just read. The positive signal generated by the amplifier 21 is sent as well to the flip-flop 34, whereupon the flip-flop 23 is reset to the state I.

The operation is now completed for the denominational order D3 and similar operations occur in the higher orders during the same accumulator cycle.

Assume now that the order AR4 of the accumulating register is filled up with nine positive points and that the flip-flop 23 has been set to the state II upon the erasure of a positive point of IR4. The magnetic head 17 runs all over the nine positive points of AR4 without any effect, until it reaches IR5. The *d* signal thereupon generated by the timer 19 opens the gate 24 and sets the flip-flop 30 to the state II. Since said *d* signal moreover resets the flip-flop 22 to the state I, the gate 31 is opened and the magnetic head 18 is energized. Said energization is of negative polarity owing to the action of the polarity changer 32, whereby all the positive points of AR4 are erased. The magnetic head 17 passes thereafter to AR5, wherein it is supposed to be enabled to write the positive point picked up from IR4. As long as the magnetic head 17 runs over AR5, the gate 31, which is coupled to the state I of the flip-flop 22, disables the magnetic head 18. As the magnetic head 17 passes from AR5 to IR6 the *d* signal thereupon generated resets the flip-flop 30 to the state I, the flip-flop 23 having previously been reset to the state I.

If, on the contrary, the magnetic head 17 is unable to write the positive point into AR5, the flip-flop 23 is not reset to I and the *d* signal generated between AR5 and IR6 re-energizes the erasing head 18.

It will be apparent that no cycle signal has to be separated at the beginning of an accumulator cycle since said signal is not strictly required for the operation described hereinabove.

*Subtraction*

To perform a subtraction the switches 27, 58, 32 and 34*a* are shifted to their position of subtraction S. Thereupon the machine will operate as schematically illustrated in the lower part S of Fig. 4. Since this mode of operation is similar to the mode of operation outlined hereinabove, it will not be described in detail.

*Calculating apparatus for the four rules*

The above computing apparatus may be easily transformed into a calculating apparatus for the four rules upon addition of suitable supplementary devices. Fig. 6 shows a block diagram of an embodiment of said supplementary devices. Said diagram, when coupled to the diagram of Fig. 5 according to the diagram of connection shown in Fig. 7, provides a suitable adaptation of said computing apparatus to a calculating apparatus for the four rules. In the present embodiment of the invention multiplication and division are performed according to the method of repeated addition and repeated subtraction respectively, and the calculating apparatus works fully automatically.

Referring now to Fig. 6, 35 indicates an accumulator which is similar to the accumulator 16 of Fig. 5, and which is likewise split in two groups of suborders, namely the suborders HR1, HR2 . . . HR*n* of an auxiliary register HR and the suborders TR1, TR2 . . . TR*n* of a revolution counter TR. The auxiliary register HR is provided to retain the multiplicand or the divisor, respectively, and the revolution counter TR is provided to store the multiplier or the quotient, respectively. The accumulator 35 rotates bodily with the accumulator 16 and is shown in Fig. 6 developed in a plane. Practically, the accumulator 35 may be formed of a second magnetic track applied to the drum carrying the magnetic track 16.

One magnetic head 36 is provided for the accumulator 35. This magnetic head comprises both a reading coil and a writing coil. Whilst the magnetic heads 17 and 18 are secured to the machine frame, the magnetic head 36 is secured to an escapement slide 37 slidably mounted on a rail 38 also secured to the machine frame, whereby the rail 38 is rigidly connected to the means 60 mounting the heads 17 and 18. This rail is concentric with the axis of rotation of the accumulator drum and is shown developed in a plane in Fig. 6. The movement of the magnetic head 36 corresponds to the step by step movement either of the conventional carriage of mechanical calculating machines or of the pin carriage of ten key calculating machines, and may be effected by any escapement mechanism embodiment in the slide 37 and known in the art, say for example by an electromagnetic escapement of the selector type.

39 indicates a timer to be added to the timer 19 of Fig. 5 and which may be formed of a wheel rotating at an angular speed of $1/12$ of the angular speed of the accumulator drum. Therefore, one revolution of said wheel provides a period of twelve accumulator cycles. Said period is utilized to establish the timed relation of the operations occurring in multiplication and division, respectively.

To perform a multiplication, the multiplicand is entered into the auxiliary register HR in the same order as the amounts previously entered into IR and AR, and with as many zeros added as are the digits of the multiplier less one. The multiplier is entered into the counter TR, but in the opposite order, i.e. in the order in which it is normally written.

Briefly, the multiplying process comprises the steps of periodically erasing one unit of the multiplier, beginning from TR1, of copying into IR the multiplicand read in HR and, finally, of adding up the multiplicand in AR. This periodical process is repeated as many times as are required to erase all the positive points of TR1, whereupon the magnetic head 36 is shifted one order to the right and the operation is resumed for each positive point of TR2.

To perform a division the divisor is entered into HR with as many zeros added as is the difference between the number of digits of the dividend and that of the divisor. The dividend is entered into AR. Both amounts are entered in the usual order.

Briefly, the division process comprises the steps of periodically writing a unit into TR1, of copying into IR the divisor read in HR and, finally, of subtracting the divisor from AR. This process is repeated until an overdraft occurs in AR, whereupon the divisor is added back into AR during a period performed according to the multiplying process seen above. The magnetic head 36 is thereafter shifted one order to the right and the operation is resumed for each positive point to be written into TR2, to thereby form the quotient.

Of course, the preliminary addition of zeros to the multiplicand and to the divisor, respectively, as mentioned above, corresponds to one of the several methods followed in conventional calculating machines.

To perform the processes illustrated above the wheel of the timer 39 generates some synchronizing signals, the timed relation of which is diagrammatically shown in Fig. 8.

The signal P0 indicates the beginning of a new period 40, the first cycle 40' of which will be called counting cycle, inasmuch as a positive point is erased from or written into the counter TR during said cycle. Signal P1 indicates the beginning of a cycle 40'', which will be called copying cycle, inasmuch as the amount read in HR will be copied into IR during said cycle. The signal P2 indicates the beginning of a series 40''' of ten add or subtract cycles which are performed according to the addition and the subtraction method, respectively.

Referring now to Fig. 6, the units shown in block form comprise mainly amplifier, gate and flip-flop circuits of the types previously referred to with reference to Figs. 3 and 5 in connection with similar conventional circuits and shall not be described in detail. The reading coil of the magnetic head 36 is coupled through an amplifier 41 to the input *x* of an and-gate 43. The input *w* of the latter is coupled to the output II of a flip-flop 44, which is settable to the state II by the signal P0. A further input *y* of the gate 43 is coupled to the output II of the flip-flop 22, Fig. 5, whereby the gate 43 may be opened during the phases TR only of the magnetic head 36. The output of the gate 43 applies, through an and-gate 45 controlled by the *m* signal, to an amplifier 46 which is coupled to the writing coil of the magnetic head 36.

The output of the amplifier 46 applies furthermore to the input I of the flip-flop 44 and to the input II of a flip-flop 47. The output II of the latter applies to the input II of a flip-flop 49, through an and-gate 48. The output II of the flip-flop 49 is coupled to an input of an and-gate 50, two further inputs of which are energizable by the amplifier 41 and by the output I of the flip-flop 22, Fig. 5, respectively. It will thus be seen that the gate 50 may be opened during the phases HR only of the magnetic head 36. The output of the gate 50 applies to the writing coil of the magnetic head 17, Fig. 5, through an and-gate 51 controlled by the *m* signal and through an auxiliary amplifier 59.

The output I of the flip-flop 49 is coupled to the third input of the gate 29, Fig. 5. Normally this input is energized, since the flip-flop 49 is settable to the state II by an incoming signal P1 but is immediately reset to the state I by the next following signal P2. Therefore, if the block diagram shown in Fig. 5 is to be used for addition and subtraction only, the third input of the gate 29 may be ignored.

The output II of the flip-flop 44 applies furthermore to an and-gate 52, which under the control of the output I of the flip-flop 22 may cause a switch 53 to operate the escapement mechanism of the magnetic head 36. It is not necessary to describe the mode of operation of said switch in detail, since it is obvious to anyone skilled in the art. A return signal may be sent by the switch 53 to reset the flip-flop 44 to its state I.

*Multiplication*

As mentioned hereinbefore, the multiplicand is stored in the auxiliary register HR and the multiplier is stored in the counter TR at the beginning of a multiplication. Furthermore, the magnetic head 36 is in its left hand end position in alignment with the magnetic head 17 of Fig. 5. In Figs. 5 and 6 the two magnetic heads are shown in the position assumed after having run over TR2 and AR2 respectively.

Upon initiating the multiplication, say by depressing a conventional multiplication key, a period 40, Fig. 8, is started, during the twelve cycles of which the machine operates as hereinafter described. It is to be remarked that during the multiplication the switches 34*a*, 58, 27 and 32, Fig. 5, remain locked in their position of addition, as is known in the art.

*Counting cycle 40'*.—The signal P0 sets the flip-flop 44 to the state II, thereby energizing the input *w* of the gate 43. However, the signals sent by the positive points of HR1 through the amplifier 41 are ineffective, since the input *y* of the gate 43 is not energized. As the magnetic head 36 passes from HR1 to TR1 the input *y* of the gate 43 is energized and upon reading the first positive point of TR1, the gate 43 is enabled to energize the writing coil of the magnetic head 36, which erases the positive point just read.

The writing signal thus sent by the amplifier 46 applies as well to the flip-flop 47, to set the latter to the state II, and to the flip-flop 44, to reset it to its state I. The gate 43 will thereby be disabled until completion of the period.

During the counting cycle the magnetic head 17, Fig. 5, remains inoperative, because no amount is stored in the input register IR.

*Copying cycle 40''*.—The signal P1 is sent to the gate 48, which is thereby enabled to set the flip-flop 49 to the state II; at the same time the flip-flop 47 is reset to the state I. The flip-flop 49 energizes the gate 50, thereby permitting the multiplicand to be copied. More particularly, the signals generated by the positive points of HR1, HR2 . . . HR*n*, are sent, through the amplifier 41, the gate 50, the gate 51 and the auxiliary amplifier 59, to the writing coil of the magnetic head 17, Fig. 5. The corresponding positive points will thereby be written into the input register IR and the entire multiplicand will be copied during the copying cycle. At the end of said cycle the signal P2 resets the flip-flop 49 to the state I, whereby the gate 50 will be disabled until completion of the period.

During the copying cycle the magnetic heads 17, Fig. 5, remains inoperative, since the flip-flop 49 has been set to its state II, thereby disabling the gate 29, Fig. 5.

*Series of ten cycles 40'''*.—The multiplicand stored in the input register IR is now transferred into the accumulating register AR according to the addition process illustrated hereinabove.

During said series of ten cycles the magnetic head 36, Fig. 6, remains inoperative, since both the flip-flops 44 and 49 are in their state I.

Upon completion of said series of cycles a new signal P0 is generated, thereby starting a similar period, provided the magnetic head 36 reads another positive point in TR1 during the counting cycle of said period.

*Shifting*.—If, on the contrary, no positive point is read in TR1 during said counting cycle, and no negative point is thereby written by the magnetic head 36, the flip-flop 44 will not be reset to the state I. As the flip-flop 22 is set to the state I at the end of TR1 the gate 52 is energized, thus operating the switch 53. The magnetic head 36 is thereupon shifted one order to the right. At the same time the flip-flop 44 is reset to its state I, whereby both the magnetic heads 17 and 36 remain inoperative until completion of the period. It is to be remarked that some 11 cycles are at disposal for shifting the magnetic head 36.

During the next following period the process is repeated for the positive points of TR2 and so on until the whole multiplier will have been erased from the counter TR.

The described embodiment of a calculating apparatus requires the provision of the following additional devices for enabling the apparatus to perform automatic division.

An and-gate 54, Fig. 6, is provided for alternatively switching a flip-flop 55 upon each simultaneous energization of both its inputs, one input being controlled by the output II of the flip-flop 23, Fig. 5, and the other input being controlled by any signal of a plurality of end-of-cycle signals P$k$ generated by the timer 39 as diagrammatically shown in Fig. 8. A further and-gate 56 is provided for shifting the switch 34$a$ and, therefore, the switches 27, 58 and 32 to the position of addition A when simultaneously energized by the output II of the flip-flop 55 and by the signal P0. A third and-gate 57 may operate the switch 53 under the control of the output II of the flip-flop 55 and of the signal P2. The switch 34$a$ and, therefore, the switches 27, 58 and 32 may be reset to their position of subtraction S by the signal P0. Of course, the switches 27, 58 and 32 are associated with the switch 34$a$ and in this case they are preferably of the electromagnetic or electronic type adapted for automatic operation so as to be simultaneously shiftable by any suitable electric control.

As mentioned hereinabove, at the beginning of an operation of division the dividend is stored in the accumulating register AR and the divisor is stored in the auxiliary register HR. The magnetic heads 36 and 17 are in their left hand end position. Upon initiating the division, say by depressing a conventional division key, a period 40, Fig. 8, is started.

Upon operation of said initiating means the flip-flop switch 34$a$, as well as the switches 27, 58 and 32 associated therewith will be shifted to their position of subtraction S and will remain under the control of the apparatus as is well known in the art. Moreover, an auxiliary polarity changer associated with the flip-flop elements 34$a$ and 22 is provided for controlling the operation of the magnetic head 36, whereby, if the flip-flop 34$a$ is in its position A, a negative point is written into the revolution counter TR upon the sensing of a positive point, and, vice-versa, if the flip-flop 34$a$ is in its position S, a positive point is written into TR upon the sensing of a negative point. It will be apparent that this mode of operation is derived from that of a conventional revolution counter, which is operated subtractively in multiplication and additively in division. Therefore, no further details will be given in respect of said auxiliary polarity changer. It is only to be remarked that, inasmuch as said polarity changer is controlled by the flip-flop 22, the magnetic head 36 will be enabled to operate differentially in respect of the revolution counter TR, but not of the auxiliary register HR.

At the beginning of the division operation the flip-flop 55 is in its state I. During the twelve cycles of the period 40 the apparatus operates as follows. Where not illustrated, the mode of operation is the same as that described in connection with multiplication.

*Counting cycle 40'.*—The signal P0 sets the flip-flop 44 to the state II and, as illustrated above, a positive point is written into TR1 upon the sensing of the first negative point. The flip-flop 44 is thereby reset to its state I.

*Copying cycle 40''.*—During this cycle the entire divisor will be copied into the input register IR, in the same manner as seen in multiplication.

*Series of ten cycles 40'''.*—The divisor stored in the input register IR is now transferred into the accumulating register AR during repeated subtract cycles according to the subtraction process illustrated above. Upon completion of said series of cycles a new signal P0 is generated, thereby starting a similar period, provided no overdraft has occurred in the accumulating register AR.

*Overdraft period.*—If, on the contrary, an overdraft occurs during one of the cycles of said series of subtract cycles, the magnetic head 17 is unable to write into AR the positive point picked up from IR during said cycle, whereby the flip-flop 23 is not reset to the state I, and the magnetic head 18 will write positive points into AR. Upon completion of said cycle the gate 54 is simultaneously energized by the output II of the flip-flop 23 and by the signal P$k$, whereby the flip-flop 55 is set to the state II. Moreover the signal P$k$, the generation of which may depend upon the operation of the division initiating means, resets the flip-flop 23 to the state I, thereby preventing a fugitive one to be transmitted from the highest order to the lowest order of the accumulating register AR during division.

During the remaining cycles of said series of cycles the operation is continued as before.

*Addition and shifting period.*—Upon reception of the next following P0 signal the gate 56 shifts the flip-flop 34$a$ and, therefore, the switches 27, 58 and 32, to their position of addition A whereby during the following period the machine will operate as in multiplication. During said period a positive point is therefore erased from the revolution counter TR and the divisor is added into the accumulating register AR. Upon completion of the copying cycle of this period the gate 57 is simultaneously energized by the output II of the flip-flop 55 and by the signal P2, thereby operating the switch 53 and causing the magnetic head 36 to be shifted one order to the right. It is to be remarked that some ten cycles are at disposal for shifting the magnetic head 36.

As mentioned above, the divisor is added back into the accumulating register AR during the series of ten cycles following the signal P2. During one of said cycles an overdraft occurs again in AR. Upon completion of said cycle the gate 54 is simultaneously energized by the output II of the flip-flop 23 and by the signal P$k$, thereby resetting the flip-flop 55 to its state I. Moreover, the signal P$k$ resets the flip-flop 23 to the state I, thereby preventing the transmission of a fugitive one.

Upon completion of this period the signal P0 shifts the flip-flop 34$a$, and, therefore, the switches 27, 58 and 32 to their position of subtraction S and the process is resumed for the positive points to be written into TR2.

Summarizing, it will be apparent that for each digit of the value $n$ of the quotient $n+2$ periods of operation are required, similarly to what happens in conventional calculating machines.

No consideration is given here to some details which have to be provided to allow a satisfactory operation of the apparatus, since they are obvious to those skilled in the art.

What I claim is:

1. In an impulse counting device, an accumulator having a plurality of bistable elements arranged in denominational orders and each adapted to be commutated to assume either of two conditions representative of the state of the element, namely a clear condition and an accumulating condition, means for sensing said elements, first commutating means operable for commutating said elements element by element, second commutating means operable for sequentially commutating said elements order by order, means for mounting said sensing and said first and second commutating means, said first commutating means being enabled to commutate the element actually sensed by said sensing means, said second commutating means being arranged at a distance of one order towards the lower orders with respect to said first commutating means, means for cyclically moving said accumulator with respect to said mounting means to enable said sensing means to sequentially sense said elements from the lower orders towards the higher orders, means for entering an impulse into said device, first operating means under the combined control of said sensing and said entering means for operating said first commutating means upon the sensing of the first element showing a certain one of said two conditions, and second operating means conditionable under the combined control of said sensing and said entering means for operating said second commutating means upon the sensing of a full order wherein none of said elements showed said certain condition.

2. In an impulse counting device as claimed in claim 1, polarity changing means settable for determining whether said entered impulse is to be counted either additively or subtractively, said polarity changing means controlling said first operating means to correspondingly operate said first commutating means upon the sensing of the first element showing either a clear condition if the impulse is to be counted additively, or an accumulating condition if the impulse is to be counted subtractively, said polarity changing means furthermore controlling said second operating means to correspondingly operate said second commutating means upon the sensing of a full order wherein none of said elements showed either a clear condition if the impulse is to be counted additively, or an accumulating condition if the impulse is to be counted subtractively.

3. In a digital computing apparatus, an accumulator having a plurality of bistable elements arranged in denominational orders and adapted to be commutated to assume either one of their two states to represent a multiorder amount, means for sensing said elements, first commutating means operable for commutating said elements element by element, second commutating means operable for sequentially commutating the elements of a full order of said represented amount, means for mounting said sensing and said first and second commutating means, said first commutating means being enabled to commutate the element actually sensed by said sensing means, said second commutating means being arranged at a distance of one order of said represented amount towards the lower orders with respect to said first commutating means, means for cyclically moving said accumulator with respect to said mounting means to sequentially present said elements to said sensing and said first and second commutating means from the lower orders towards the higher orders, means controlled by said sensing means and settable for operating said second commutating means upon the sensing of a full order of said represented amount wherein none of said elements showed a certain one of said two states, and means for setting said settable means in response to a unit to be entered into the accumulator.

4. In a digital computing apparatus, an accumulator having a plurality of bistable elements arranged in denominational orders and adapted to be commutated to assume either one of their two states to represent a multiorder amount, means for sensing said elements, first commutating means operable for commutating said elements element by element, second commutating means operable for sequentially commutating the elements of a full order of said represented amount, means for mounting said sensing and said first and second commutating means, said first commutating means being enabled to commutate the element actually sensed by said sensing means, said second commutating means being arranged at a distance of one order of said represented amount towards the lower orders with respect to said first commutating means, means for cyclically moving said accumulator with respect to said mounting means to sequentially present said elements to said sensing and said first and second commutating means from the lower orders towards the higher orders, means settable in response to a unit to be entered into the accumulator, first operating means under the combined control of said sensing and said settable means for operating said first commutating means upon the sensing of the first element showing a certain one of said two states, and second operating means conditionable under the combined control of said sensing and said settable means for operating said second commutating means upon the sensing of a full order of said represented amount wherein none of said elements showed said certain state.

5. In a digital computing apparatus, an accumulator having a plurality of magnetizable elemental areas arranged in denominational orders on a single magnetic track cyclically movable past a first and a second magnetic head from the lower orders toward the higher orders, said areas each being in a first or a second magnetic condition to represent digits of a multiorder amount, said first magnetic head comprising a reading coil and a first writing coil, said writing coil facing the elemental area moving past said reading coil and being operable for recording either of said two magnetic conditions in the faced elemental area, and said second magnetic head comprising a second writing coil operable for sequentially recording either of said two magnetic conditions in the elemental areas of a full order of said represented amount, said second magnetic head being arranged at a distance of one order of said represented amount towards the lower orders from said first magnetic head, first means controlled by said reading coil and settable for operating said first writing coil upon the reading of the first one of said areas of an order of said represented amount showing a certain one of said two magnetic conditions, second means controlled by said reading coil and settable for operating said second writing coil upon the reading of a full order of said represented amount wherein none of said areas showed a certain one of said two magnetic conditions, and means for setting said first and second settable means in response to a digit to be entered into the accumulator.

6. In a digital computing apparatus, an accumulator having a number of denominational orders, said accumulator being subdivided into an input register and an accumulating register, said registers being interspersed whereby each order of the accumulator is formed of the corresponding suborders of said registers, each suborder having a plurality of bistable elements adapted to be commutated to assume either one of their two states to represent an order of an amount, means for sensing said elements, means operable for commutating said elements, means for mounting said sensing and said commutating means, said commutating means being enabled to commutate the element actually sensed by said sensing means, means for cyclically moving said accumulator with respect to said mounting means to sequentially present said elements to said sensing and said commutating means from the lower order towards the higher orders, means for generating timing signals identifying the register whose suborder is being presented to said sensing means, and operating means under the combined control of said sensing and said generating means for operating said commutating means during the presentation of said input register upon the sensing of the first element showing a certain one of said two states and for operating said commutating means during the presentation of said accumulating register upon the sensing of the first element showing the other of said two states.

7. In a digital computing apparatus, an accumulator having a number of denominational orders, said accumulator being subdivided into an input register and an accumulating register, said registers being interspersed whereby each order of the accumulator is formed of the corresponding suborders of said registers, each suborder having a plurality of bistable elements adapted to be commutated to assume either one of their two states to represent an order of an amount, means for sensing said elements, first commutating means operable for commutating said elements element by element, second commutating means operable for sequentially commutating the elements of a full suborder, means for mounting said sensing and said first and second commutating means, said first commutating means being enabled to commutate the element actually sensed by said sensing means, said second commutating means being arranged at a distance of one suborder towards the lower orders with respect to said first commutating means, means for cyclically moving said accumulator with respect to said mounting means to sequentially present said elements to said sensing and said first and second commutating means from the lower orders towards the higher orders, means for generating timing signals identifying the register whose suborder is being presented to said sensing means, first operating means under the combined control of said sensing and said generating means for operating said first commutating means during the presentation of said input register upon the sensing of the first element showing a certain one of said two states and for operating said first commutating means during the presentation of said accumulating register upon the sensing of the first element showing the other of said two states, and second operating means conditionable under the combined control of said sensing and said generating means for operating said second commutating means upon the sensing of a full suborder of said accumulating register wherein none of said elements showed said other state.

References Cited in the file of this patent

UNITED STATES PATENTS

| | | |
|---|---|---|
| 2,549,071 | Dusek et al. | Apr. 17, 1951 |
| 2,609,143 | Stibitz | Sept. 2, 1952 |
| 2,700,148 | McGuigan | Jan. 18, 1955 |
| 2,785,855 | Williams | Mar. 19, 1957 |
| 2,787,416 | Hansen | Apr. 2, 1957 |
| 2,790,599 | Gloess | Apr. 30, 1957 |